D. A. HAAS.
CORN PLANTER.
APPLICATION FILED JUNE 15, 1912.

1,054,538.

Patented Feb. 25, 1913.

2 SHEETS—SHEET 1.

Witnesses
Philip E. Barnes
W. T. Bagger

Inventor
Daniel A. Haas

By Victor J. Evans
Attorney

D. A. HAAS.
CORN-PLANTER.
APPLICATION FILED JUNE 15, 1912.
1,054,538.
Patented Feb. 25, 1913.
2 SHEETS—SHEET 2.
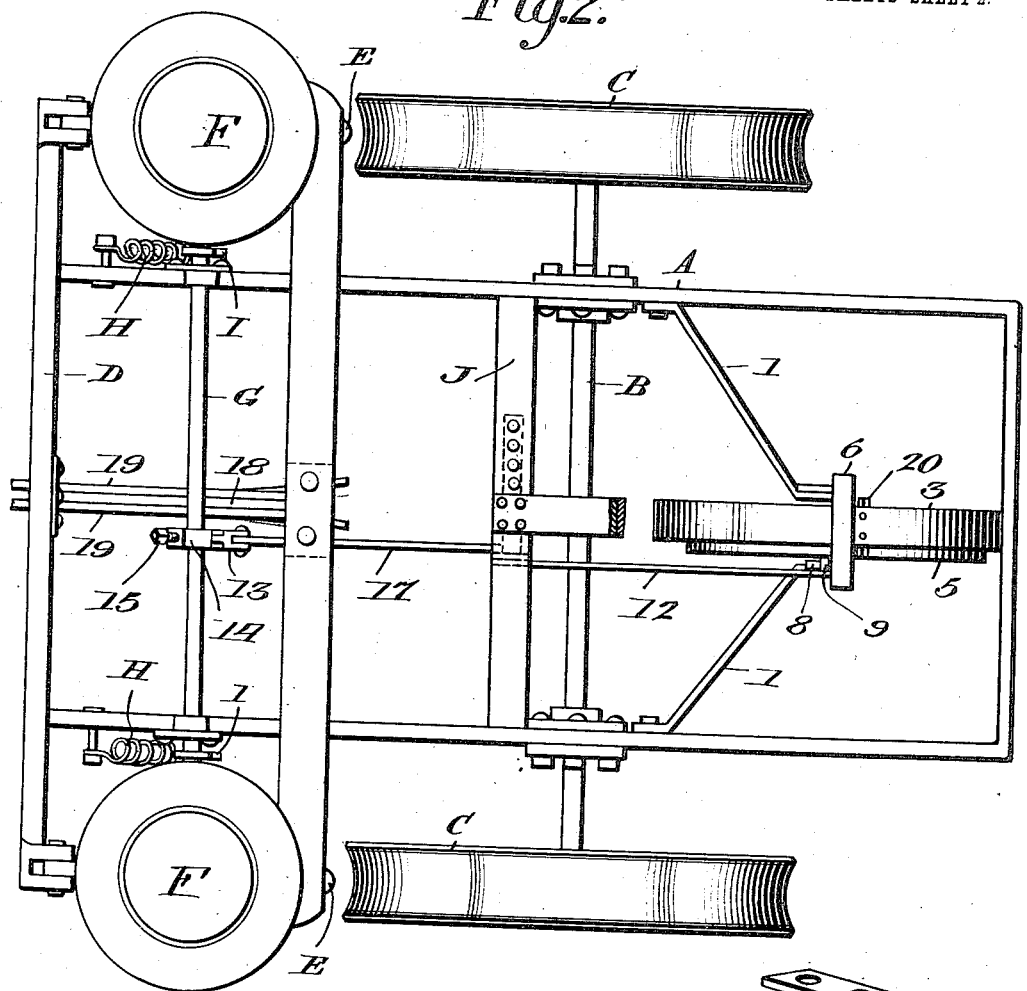
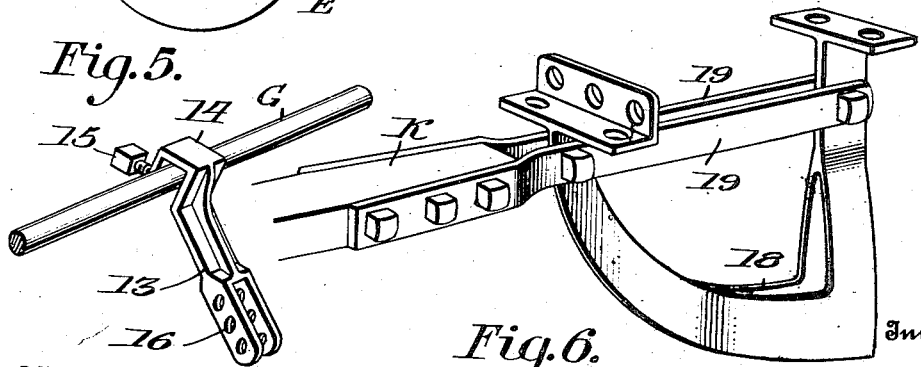
Witnesses
Philip E. Barnes
Inventor
Daniel A. Haas
By Victor J. Evans
Attorney

UNITED STATES PATENT OFFICE.

DANIEL A. HAAS, OF STOOKEY TOWNSHIP, ST. CLAIR COUNTY, ILLINOIS.

CORN-PLANTER.

1,054,538.

Specification of Letters Patent. Patented Feb. 25, 1913.

Application filed June 15, 1912. Serial No. 703,850.

*To all whom it may concern:*

Be it known that I, DANIEL A. HAAS, a citizen of the United States, residing in Stookey township, in the county of St. Clair and State of Illinois, have invented new and useful Improvements in Corn-Planters, of which the following is a specification.

This invention relates to corn planters, and it has for its object to provide an attachment or appliance of simple and inexpensive construction whereby corn may be planted in check without the use of a check wire.

A further object of the invention is to provide a planter attachment including a ground engaging wheel whereby the planting mechanism is actuated and a special runner which is mounted in front of said ground engaging wheel to prepare a track for the same.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
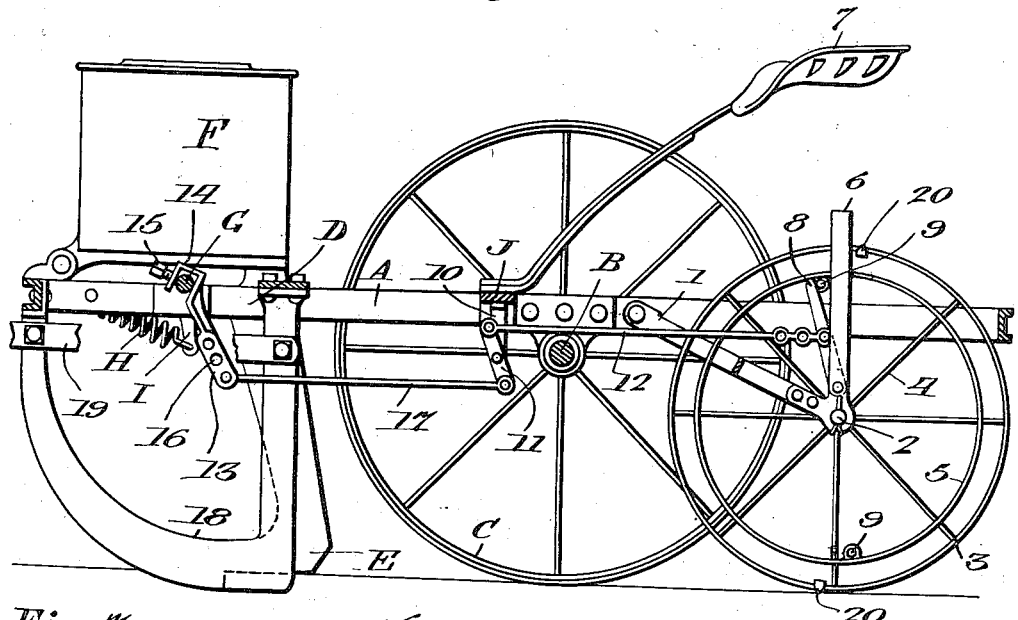
Figure 3:
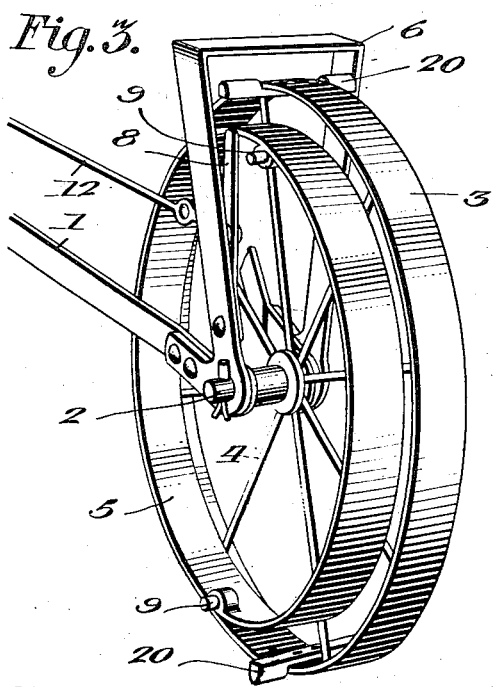
Figure 4:
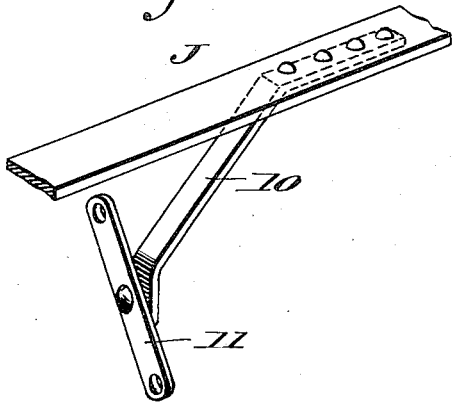

In the drawings,—Figure 1 is a sectional elevation of a corn planter constructed and equipped in accordance with the invention. Fig. 2 is a top plan view of the same. Fig. 3 is a perspective detail view of the operating wheel and related parts, detached. Fig. 4 is a perspective detail view of the cross bar of the frame carrying the lever which is used in transmitting motion from the operating wheel to the rock shaft, whereby the seed dropping mechanism is actuated. Fig. 5 is a perspective detail view, showing a portion of the rock shaft with the crank member applied thereto. Fig. 6 is a perspective detail view of the auxiliary runner.

Corresponding parts in the several figures are denoted by like characters of reference.

A designates the main frame of an ordinary conventional corn planter, and B is the axle having transporting and covering wheels C whereby the frame is supported.

D represents the runner frame which is equipped with the runners or furrow openers E, which are arranged directly in front of and in alinement with the covering wheels and with the seed boxes or hoppers F, the latter affording bearings for a rock shaft G, whereby the planting or seed dropping mechanism, which may be of any desired construction, is actuated in the usual or in any customary or well known manner. The rock shaft is normally actuated in one direction by means of retracting springs H connected with arms I associated with the rock shaft. It is well understood that a rock shaft of this character is utilized in many types of corn planters for the purpose of actuating the seed dropping mechanism, and it is also well understood that by the extent to which the shaft is rocked or oscillated, the valves governing the escape of the seed may be actuated so as to regulate the number of seeds that are permitted to drop at each operation. These features are well known in the art, and as they form no part of the present invention, it is not deemed necessary to further describe or to particularly illustrate the same.

The improved attachment includes a pair of supporting bars 1, the forward ends of which are connected with the side bars of the planter frame A, said supporting bars converging in a rearward direction and providing bearings for a shaft 2 carrying a ground engaging wheel 3, on the spokes 4 of which is mounted a similar concentric wheel or rim 5. The wheel 3 is supported about midway between the covering and transporting wheels of which it is entirely independent. The rear ends of the supporting bars 1 are connected by an upwardly extending yoke 6 which is positioned beneath the driver's or operator's seat 7 of the planter. Fulcrumed on one of the limbs of the yoke 6 is a lever 8 which extends upwardly in the path of pins or tappet members 9 which are associated with the wheel 5, adjacent to the rim of the latter, where said pins or tappet members may be secured in any convenient manner. The wheel 5 being smaller or of less diameter than the ground engaging wheel 3 upon which it is secured, it follows that the tappet members 9 will be supported clear of the ground so that clods of earth or clay will not adhere thereto and interfere with the operation of the lever 11, or render such operation irregular. The cross bar J of the planter frame which is positioned above the axle B supports an angular bracket member 10 supporting a vertically disposed lever 11, the upwardly extending arm of which is connected with the lever 8 by a connecting rod 12.

13 designates a crank arm having at its upper end a hook 14 engaging the rock shaft G upon which the crank arm is mounted and secured in any suitable manner; for instance, by a set screw 15 engaging the rock shaft through the hook 14. The crank arm 13 has a plurality of apertures 16 one of which is connected by a link or connecting rod 17 with the downwardly extending arm of the lever 11. The connections between the arms of the lever 11 and the rods 12 and 17, as well as the connections between said rods and the lever 8 and crank arm 13, are to be of such a nature that the parts will be capable of operating freely and unobstructedly.

Suitably connected with the runner frame D which is provided with a forwardly extending tongue K is an auxiliary ground engaging runner 18 which is situated directly in front of the ground engaging wheel 3 so as to clear a track for the latter; the runner 18 is preferably connected with the tongue by means of bars or connecting members 19. The runner 18 will serve to clear away any obstructions in advance of the ground engaging wheel 3 which travels in the path thus prepared and the operation of which will, therefore, not be interfered with by clods, stones or other obstructions lying on the ground. The ground engaging wheel 3 is provided with marking blocks 20 secured upon the rim of said wheel at diametrically opposite sides for the purpose of marking the ground in alinement with the places where seed is dropped, said markers being obviously secured in such a manner as to be readily adjustable to the proper position.

From the foregoing description, taken in connection with the drawings hereto annexed, it will be readily seen that the rock shaft whereby the seed dropping mechanism is actuated will be rocked or oscillated at regular intervals by the action of the pins or tappet members 9 associated with the wheel 5 which is concentric with and rotates in unison with the ground engaging wheel 3. When a pin 9 engages the lever 8, the latter will be rocked, thus rocking the lever 11 through the medium of the rod 12 and transmitting a rocking motion to the shaft G by means of the crank arm 13 and connecting rod 17. The rocking or oscillatory motion will take place at regular intervals, the pins or tappet members being located at diametrically opposite sides of the rim of the wheel 5. The distance between the hills will be governed by the circumference of the ground engaging wheel 3. Thus, when said wheel has a circumference of eight feet, it is obvious that the seed dropping mechanism will be actuated at intervals of four feet, and so on, according to the circumference of the wheel. The yoke 6 serves to guard the ground engaging wheel as well as the tappet wheel 5, and also to support the lever 8 which is actuated by the pins or tappets 9. The said yoke may also be utilized as a handle whereby the ground engaging wheel carrying the tappet wheel may be lifted to a non-engaging position with respect to the ground.

Having thus described the invention, what is claimed as new, is:—

1. The combination with a corn planter having a rock shaft associated with the seed dropping mechanism of said planter, and a retracting spring whereby said rock shaft is actuated in one direction, of a crank arm, means whereby said arm is mounted detachably on the rock shaft, rearwardly converging bars secured on the sides of the planter frame, an upwardly extending yoke connecting the rear ends of said bars, a shaft supported for rotation by said bars, a ground engaging wheel on said shaft, a smaller wheel associated with the ground engaging wheel and concentric therewith, tappet members connected with the rim of the smaller wheel, a lever fulcrumed on the yoke and lying in the path of the tappet members, a suitably supported intermediate lever, a rod connecting the upwardly extending arm of said intermediate lever with the lever fulcrumed on the yoke, and a rod connecting the downwardly extending arm of the intermediate lever with the crank arm upon the rock shaft.

2. The combination with a corn planter having a rock shaft associated with the seed dropping mechanism and spring means whereby the said rock shaft is actuated in one direction, of a crank arm mounted on the rock shaft, a ground engaging wheel mounted for rotation intermediate the sides of the planter frame, a smaller wheel associated with and concentric with the ground engaging wheel, tappet members connected with the smaller wheel, a lever supported in the path of the tappet members and actuated thereby, and means for transmitting motion between said lever and the crank arm on the rock shaft.

3. In a device of the character described, a ground engaging wheel, a smaller wheel connected with and concentric with the ground engaging wheel, tappet members associated with the smaller wheel, ground engaging marking devices mounted on the rim of the ground engaging wheel, a lever supported in the path of the tappet members and actuated thereby, and means for transmitting motion from said lever to the seed dropping mechanism of the planter.

4. In a device of the character described, the combination with a planter frame having transporting and covering wheels and a runner frame associated therewith, a ground engaging wheel supported intermediate the side members of the planter frame and about midway between the transporting and covering wheels, supporting means for said wheel including rearwardly converging bars connected with the planter frame and a yoke connecting said bars and straddling the wheel, a smaller wheel connected with and concentric with the ground engaging wheel, tappet members connected with the smaller wheel, a lever fulcrumed on the yoke and extending in the path of the tappet members, a spring retracted rock shaft associated with the seed dropping mechanism of the planter, means for transmitting motion from the lever fulcrumed on the yoke to the spring retracted rock shaft, and an auxiliary runner associated with the runner frame and positioned directly in front of the ground engaging wheel intermediate the sides of the planter frame to clear the track for said wheel.

In testimony whereof I affix my signature in presence of two witnesses.

DANIEL A. HAAS.

Witnesses:
ERWIN G. EIDMAN,
E. E. EIDMAN.